US008531410B2

(12) United States Patent
Roth et al.

(10) Patent No.: US 8,531,410 B2
(45) Date of Patent: Sep. 10, 2013

(54) FINGER OCCLUSION AVOIDANCE ON TOUCH DISPLAY DEVICES

(75) Inventors: Volker Roth, Berlin (DE); Althea Turner, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 955 days.

(21) Appl. No.: 12/544,148

(22) Filed: Aug. 19, 2009

(65) Prior Publication Data

US 2011/0043455 A1    Feb. 24, 2011

Related U.S. Application Data

(63) Continuation-in-part of application No. 12/511,054, filed on Aug. 18, 2009, now abandoned.

(51) Int. Cl.
G06F 3/041 (2006.01)
G06F 3/033 (2013.01)
G09G 5/00 (2006.01)

(52) U.S. Cl.
USPC ............................. 345/173; 345/156; 715/863

(58) Field of Classification Search
USPC ........... 345/156–184, 104; 178/18.01–20.04; 715/863
See application file for complete search history.

(56) References Cited

U.S. PATENT DOCUMENTS

| 8,255,830 | B2* | 8/2012 | Ording et al. | 715/810 |
|---|---|---|---|---|
| 2003/0095135 | A1* | 5/2003 | Kaasila et al. | 345/613 |
| 2006/0005131 | A1* | 1/2006 | Tao | 715/702 |
| 2007/0152978 | A1* | 7/2007 | Kocienda et al. | 345/173 |
| 2008/0136785 | A1* | 6/2008 | Baudisch et al. | 345/173 |
| 2008/0165161 | A1* | 7/2008 | Platzer et al. | 345/177 |
| 2009/0002326 | A1* | 1/2009 | Pihlaja | 345/173 |
| 2009/0051661 | A1* | 2/2009 | Kraft et al. | 345/173 |
| 2009/0167700 | A1* | 7/2009 | Westerman et al. | 345/173 |
| 2010/0207888 | A1* | 8/2010 | Camiel | 345/168 |
| 2010/0321316 | A1* | 12/2010 | Homma et al. | 345/173 |
| 2011/0234481 | A1* | 9/2011 | Katz et al. | 345/156 |
| 2012/0032979 | A1* | 2/2012 | Blow et al. | 345/647 |

OTHER PUBLICATIONS http://www.senocular.com/flash/source/?id=0.71 "Mouse Repelling Ball Cluster", Senocular, Jan. 23, 2004.*
Par-Anders Albinsson and Shumin Zhai. High precision touch screen interaction. In *Proc. CHI*, pp. 105-112, New York, NY, USA, 2003. ACM.
Patrick Baudisch, Alexander Zotov, Edward Cutrell, and Ken Hinckley. Starburst: a target expansion algorithm for non-uniform target distributions. In *AVI '08: Proceedings of the working conference on Advanced visual* interfaces, pp. 129-137, New York, NY, USA, 2008. ACM.
Renaud Blanch, Yves Guiard, and Michel Beaudouin-Lafon. Semantic pointing: improving target acquisition with control-display ratio adaptation. In *CHI '04: Proceedings of the SIGCHI conference on Human factors in computing systems*, pp. 519-526, New York, NY, USA, 2004. ACM.

(Continued)

*Primary Examiner* — Alexander Eisen
*Assistant Examiner* — Patrick F Marinelli
(74) *Attorney, Agent, or Firm* — Sughrue Mion, PLLC

(57) ABSTRACT

System and method for creating an information-free zone ("hole") in the content displayed in the area of the display where the finger touches it. The content previously displayed in the hole is pushed to the sides around the hole and thereby remains visible. This avoids the occlusion of the content and allows the user to place the cursor on the display accurately.

11 Claims, 3 Drawing Sheets

(56) References Cited

OTHER PUBLICATIONS

Bay-Wei Chang, Jock D. Mackinlay, Polle T. Zellweger, and Takeo Igarashi. A negotiation architecture for fluid documents. In *Proc. UIST*, pp. 123-132, New York, NY, USA, 1998. ACM.

Tovi Grossman and Ravin Balakrishnan. "The bubble cursor: enhancing target acquisition by dynamic resizing of the cursor's activation area." In *Proc. CHI 2005*, pp. 281-290, New York, NY, USA, 2005. ACM.

Yves Guiard, Renaud Blanch, and Michel Beaudouin-Lafon. "Object pointing: a complement to bitmap pointing in guis." In *GI '04: Proceedings of Graphics* Interface *2004*, pp. 9-16, School of Computer Science, University of Waterloo, Waterloo, Ontario, Canada, 2004. Canadian Human-Computer Communications Society.

Alex Olwal, Steven Feiner, and Susanna Heyman. Rubbing and tapping for precise and rapid selection on touchscreen displays. In *Proc. CHI*, pp. 295-304, New York, NY, USA, 2008. ACM.

Kurt Partridge, Saurav Chatterjee, Vibha Sazawal, Gaetano Borriello, and Roy Want. Tilttype: accelerometersupported text entry for very small devices. In *Proc. UIST*, pp. 201-204, New York, NY, USA, 2002. ACM.

R. L. Potter, L. J. Weldon, and B. Shneiderman. Improving the accuracy of touch screens: an experimental evaluation of three strategies. In *Proc. CHI*, pp. 27-32, New York, NY, USA, 1988. ACM.

Jun Rekimoto. Tilting operations for small screen interfaces. In *Proc. UIST*, pp. 167-168, New York, NY, USA, 1996. ACM.

Volker Roth and Thea Turner. Bezel swipe: Conflict-free scrolling and multiple selection on mobile touch screen devices. In *Proc. CHI*, 2009.

Anne Roudaut, St'ephane Huot, and Eric Lecolinet. TapTap and MagStick: improving one-handed target acquisition on small touch-screens. In *AVI '08: Proceedings of the working conference on Advanced visual* interfaces, pp. 146-153, New York, NY, USA, 2008. ACM.

Daniel Vogel and Patrick Baudisch. Shift: a technique for operating pen-based interfaces using touch. In *Proc. CHI 2007*, pp. 657-666, New York, NY, USA, 2007. ACM.

Daniel Wigdor and Ravin Balakrishnan. TiltText: using tilt for text input to mobile phones. In *Proc. UIST*, pp. 81-90, New York, NY, USA, 2003. ACM.

Daniel Wigdor, Clifton Forlines, Patrick Baudisch, John Barnwell, and Chia Shen. Lucid touch: a see-through mobile device. In *Proc. UIST*, pp. 269-278, New York, NY, USA, 2007. ACM.

Koji Yatani, Kurt Partridge, Marshall Bern, and Mark W. Newman. Escape: a target selection technique using visually-cued gestures. In *CHI '08: Proceeding of the twenty-sixth annual SIGCHI conference on Human factors in computing systems*, pp. 285-294, New York, NY, USA, 2008. ACM.

Polle T. Zellweger, Bay-Wei Chang, and Jock D. Mackinlay. Fluid links for informed and incremental link transitions. In *Proc. Hypertext*, pp. 50-57, 1998.

\* cited by examiner

FINGER OCCLUSION AVOIDANCE ON TOUCH DISPLAY DEVICES

CROSS-REFERENCE TO RELATED APPLICATION

This application claims the benefit of priority of and is a continuation-in-part of U.S. application Ser. No. 12/511,054, by common inventor Volker Roth and Althea Turner, filed Jul. 28, 2009, and entitled "FINGER OCCLUSION AVOIDANCE ON TOUCH DISPLAY DEVICES." application Ser. No. 12/511,054 is fully incorporated herein by reference for all purposes.

FIELD OF THE INVENTION

This invention relates in general to methods and systems for providing interaction with touch screen devices and, more particularly, to providing a solution to the finger occlusion problem using a novel approach.

DESCRIPTION OF THE RELATED ART

Touch display devices are rising in popularity, particularly in the area of small displays (e.g., mobile phones) and large displays (e.g., wall sized multi-touch display systems and table top touch display systems). Touch displays offer compelling features for the direct manipulation of displayed items. The user can touch and manipulate objects with a control-to-display ratio of 1, which is how we expect manipulations to occur in the "real" physical world.

However, as in the physical world, it becomes difficult to manipulate objects that are smaller than one's finger tips. For instance, users exhibit difficulties hitting objects that are only a few pixels across, as evidenced by increasing error rates and user frustration. Therefore, on the aforementioned displays a finger occlusion problem exists that makes the acquisition of small targets difficult. The problem has been studied by others in the past. Most previous solutions use call-outs, offset cursors, or zooming lenses to mitigate the problem.

Finger occlusion is a highly relevant problem when interacting with touch display devices, particularly if the display size is small. If the display size is small then in order to fit a reasonable amount of information onto the display, the displayed textual material must be rendered using small fonts and the displayed graphical material must be rendered using small graphical objects. A higher likelihood of small selection or insertion targets, in turn, leads to a higher frequency and severity of the occlusion problem. However, even on large touch displays the occlusion problem can occur.

Most solutions to the occlusion problem operate by changing the scale of the displayed material (zooming), by expanding targets into unoccupied display spaces, by offsetting the input position from the pointer position or by offsetting a cutout of the occluded display portion which again leads to a subjective offset cursor situation. These approaches easily lead to a loss of user's focus or loss of context and potentially disorient users. Target expansion is hindered by large numbers and tightly packed targets, as is the case in text selection.

Earlier work has also shown that a major contributor to high error rates is the fact that users occlude the target with their finger tip and therefore do not know where exactly to place it.

A wide range of mechanisms have been proposed to deal with this difficulty. One type of mechanism expands the zone that can be hit with a finger to acquire a target beyond the size of the target. The aforesaid target zone is usually expanded into unoccupied display areas to prevent the obstruction of other displayed material. Targets can be acquired by tapping into the target's extended zone. This method is particularly useful if the targets are sparse, but it does not scale well to larger numbers of densely positioned targets. Additionally, users lose the experience of direct manipulation when they have to aim for the larger zone rather than the target itself, to disambiguate their selection.

A better approach in this case may be a gesture-based disambiguation. Here, the user aims for the target and then moves the finger in a direction indicated by the target's icon. The direction must be memorized before the tap and must be remembered for the duration of the occlusion. Obviously, targets must be annotated graphically in a way suitable to communicate the gesture used for disambiguation to the user. This is not useful in cases where a large number of annotations would be visually distracting, e.g., in text selection. Consider, for example, that serifs already have a significant impact on the readability of a text.

Other alternatives include offset cursors and call outs in the form of magnifying lenses that show what is currently under the finger of the user. Selection usually takes place on lift-off, which has been shown to significantly reduce error rates for touch displays in general and for the acquisition of small targets in particular. However, utilizing a call out in this situation can be somewhat inefficient.

Lastly, cursor keys have been used to step a target selection crosshair onto the desired target. This can be implemented in various ways, such as using virtual keys large enough to reliably tap on them, mice, and simulated track pads. However, the space that such cursor keys consume renders it an unviable solution especially in portable devices where space is a premium.

Therefore, there is a need for systems and methods that remedy the occlusion problem without the need for call-outs, yet provide the user with the feeling of direct manipulation.

SUMMARY OF THE INVENTION

The inventive methodology is directed to methods and systems that substantially obviate one or more of the above and other problems associated with conventional techniques related to interaction of users with touch screen devices.

Aspects of the present invention include a method for avoiding occlusion on a touch screen device which includes a touch-screen input interface, a processor and a display module. The method includes using the touch-screen input interface to receive a touch input event from a user on a location on the display module, the location being characterized by location coordinates, the touch input event being caused by a touching of the display module; using the processor to create an information-free zone at the location on the display module, wherein objects within the zone are pushed out of the zone using the touch-screen input interface to sense end of the touching of the display module; and in response to the end of the touching of the display module, eliminating the zone by displaying the objects within the eliminated zone and placing the cursor within the eliminated zone.

Aspects of the present invention further include a portable device which includes a display module, a touch screen input interface and a processor. The touch-screen input interface is operable to receive a touch input event from a user on a location on the display module, with the location being characterized by location coordinates, and the touch input event being caused by a touching of the display module. Upon receiving a touch input event on the display module, the processor executes instructions for placing a cursor onto the display module, the instructions include creating an information-free zone at the location, wherein objects within the location are pushed out of the zone; in response to the end of the touching of the display module, eliminating the zone by displaying the objects within the eliminated zone and placing the cursor within the eliminated zone; and placing the cursor within the zone when the user releases the touch input.

Aspects of the present invention further include a computerized system, which includes a touch display and a processor. The touch-screen input interface is operable to receive a touch input event from a user on a location on the display module, with the location being characterized by location coordinates, and the touch input event being caused by a touching of the display module. Upon receiving a touch input event on the display module, the processor executes instructions for placing a cursor onto the display module, the instructions include creating an information-free zone at the location, wherein objects within the location are pushed out of the zone; in response to the end of the touching of the display module, eliminating the zone by displaying the objects within the eliminated zone and placing the cursor within the eliminated zone; and placing the cursor within the zone when the user releases the touch input.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
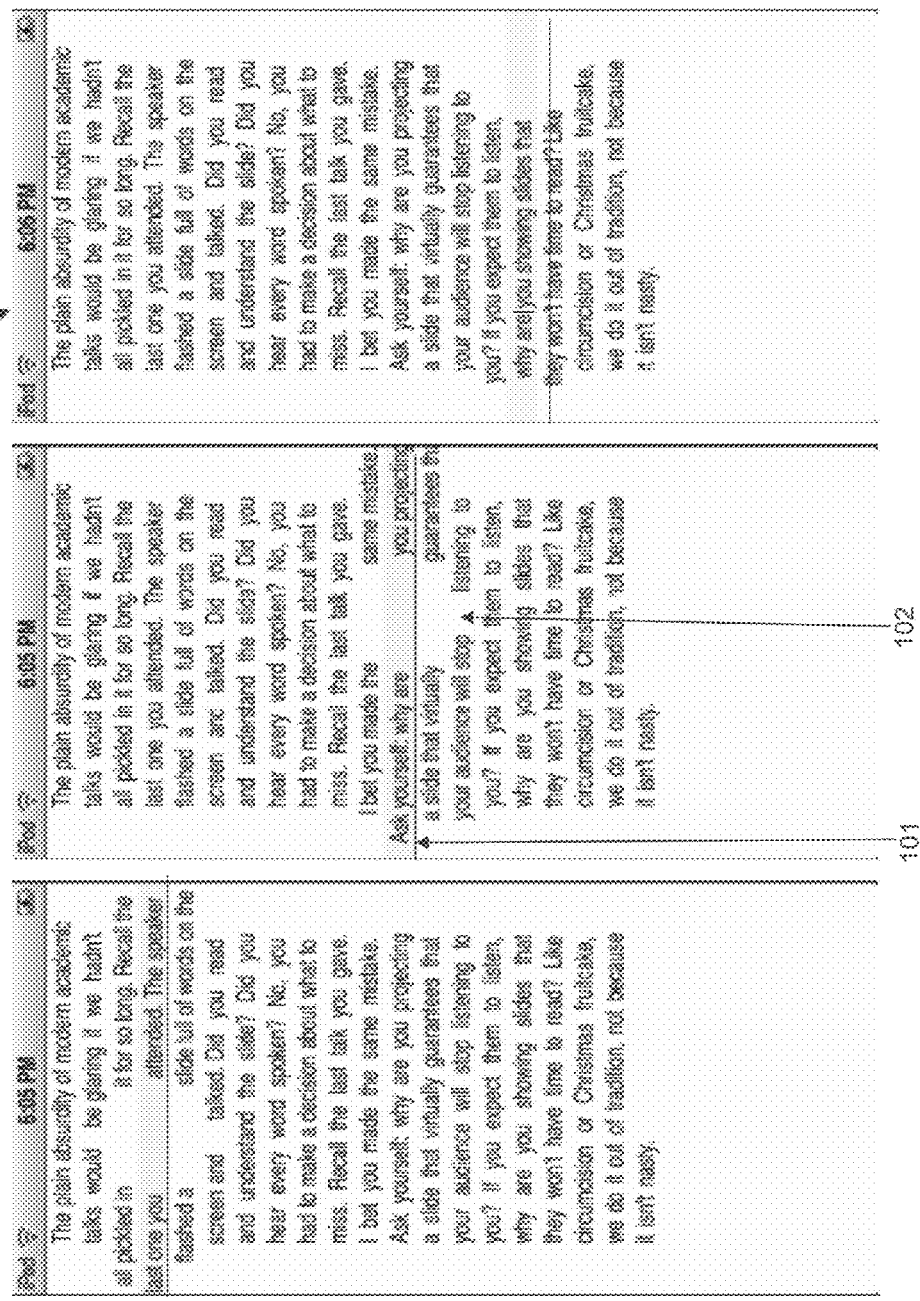
FIG. 1 illustrates an exemplary embodiment of the invention implemented on an exemplary textual display.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with an aspect of the inventive methodology, an alternative approach is being proposed, that creates an information-free zone (hole) in the content displayed in the area of the display in the proximity to the point where the finger touches it. The content is pushed to the sides around the information-free zone (hole) and thereby remains visible. This avoids the occlusion of the material entirely.

The invention will be described herein in terms of its preferred embodiment for a text insertion and text selection task in a western writing system. The modification of the inventive approach to other writing system orientations follows in a straightforward fashion. Subsequently, the preferred embodiments can be generalized and applied to other uses that more fully scope the invention. Accordingly, the invention is not limited to the shown examples only. Furthermore, the embodiment described here is a simplification of a text selection and insertion task, in that the unit in the description is a word, rather than a character. It is a simple extension of this description to embodiments in which the unit is a character or some other symbolic unit discernable by a computational device and represented on a display.

For this embodiment, we assume that the user is already in a text insertion or text marking mode. How the user enters that mode from another mode is outside the scope of this invention. Several options exists to produce such a mode change e.g., by tapping and holding the text display or by swiping through mode changing regions at the display sides into the text display.

While in text insertion mode, our mechanism traces the position of the user's finger on the touch display. The finger position is taken as the center of an ellipse with horizontal major axis and vertical minor axis. The size of the ellipse is configurable and can be personalized to approximate the area that a user's finger would occlude on the touch display.

Other shapes can be used as well but we describe our preferred embodiment in terms of an elliptical shape. Note that the shape can be parameterized to compensate for the expected viewing angle (based on display position and choice of dominant hand), finger tilt and other factors.

The mechanism calculates the intersection points of the principal axis through the shape with the intersecting text lines. In the case of a western writing system and an elliptical shape that is aligned with the horizontal and vertical display axes, the principal axis is the minor (vertical) axis of the ellipse.

For each intersection point, the mechanism finds the word such that the horizontal distance between the word's center and the intersection point is minimal. Let this word be w. Assume first that w's center is left of the intersection point. Let v be its right neighbor on the line (v may be the empty word if w does not have a right neighbor). The mechanism pushes w and all words left of it to the left until w no longer intersects the ellipse. Furthermore, the mechanism pushes v and all words right of v to the right until v no longer intersects the ellipse. We refer to this as a word division. If w's center is to the right of the intersection point, we simply let v be w and let w be the left neighbor of v. This allows us to apply the previous case.

The disclosed mechanism creates an elliptical "hole" in the text at the touch point. The "hole" follows the user's finger tip as the user swipes the finger tip across the display. All words will be displayed outside the elliptical shape and therefore no words are ever occluded. When the finger lifts off the display, the mechanism pushes the words back together and thereby restores the original positions. This process can also be animated.

FIG. 1 illustrates how the embodiment performs on an example text display.

The mechanism determines the intersection points and word centers based on the original word positions and not the word positions while a word division is in progress. This guarantees that all words can appear on both sides of a word division because for any word center there is a point to the left and right of its center (we assume that each word is at least three pixels wide and all pixels where words are displayed can be touched).

A text divider is the position between two divided words. The text insertion point or text position marking point is the divider with the smallest vertical distance to the touch point at the time of finger lift-off. This embodiment can also be implemented to highlight the line 101 on which the text insertion point occurs by changing the line's background color or by a simple line or other means. Other indications may be used to indicate the principal or secondary axis when the zone is created. Hole 102 is created where the user's finger touches the display. The rightmost illustration 103 shows how the mechanism can behave at text boundaries.

Obviously, the choice of line can be adjusted to correct for a real versus perceived center of touch, e.g., by choosing the line that is closest to the touch point plus a suitable offset. Note that the nature of this offset is different from the nature and use of the offset used in the offset cursor and other related approaches.

In the case we described above, insertion or marker points are placed on the text at word boundaries i.e., between words. The approach can be extended to perform divisions on a character basis, thereby allowing a finer granularity of insertion and marking if that is desired. Text range selection can be performed by first marking the beginning and then the end of the desired text region in the way described above.

If the touch screen device has additional sensors, such as accelerometers, a compass or a tilt sensor, then a word selection can be made with one division. For example, the user can tilt the entire device into the direction in which selection is preferred where the selection begins at the text position determined by the disclosed mechanism.

The mechanism can be generalized to other applications by treating suitable selection targets as words e.g., way points or cities on a map. In the most general case, a map can be divided by warping it onto a mesh that is distorted to reveal a hole where the user's finger is. Other symbolic units may also be used as suitable selection targets, such as non-English characters, currency symbols, etc.

Figure 2:
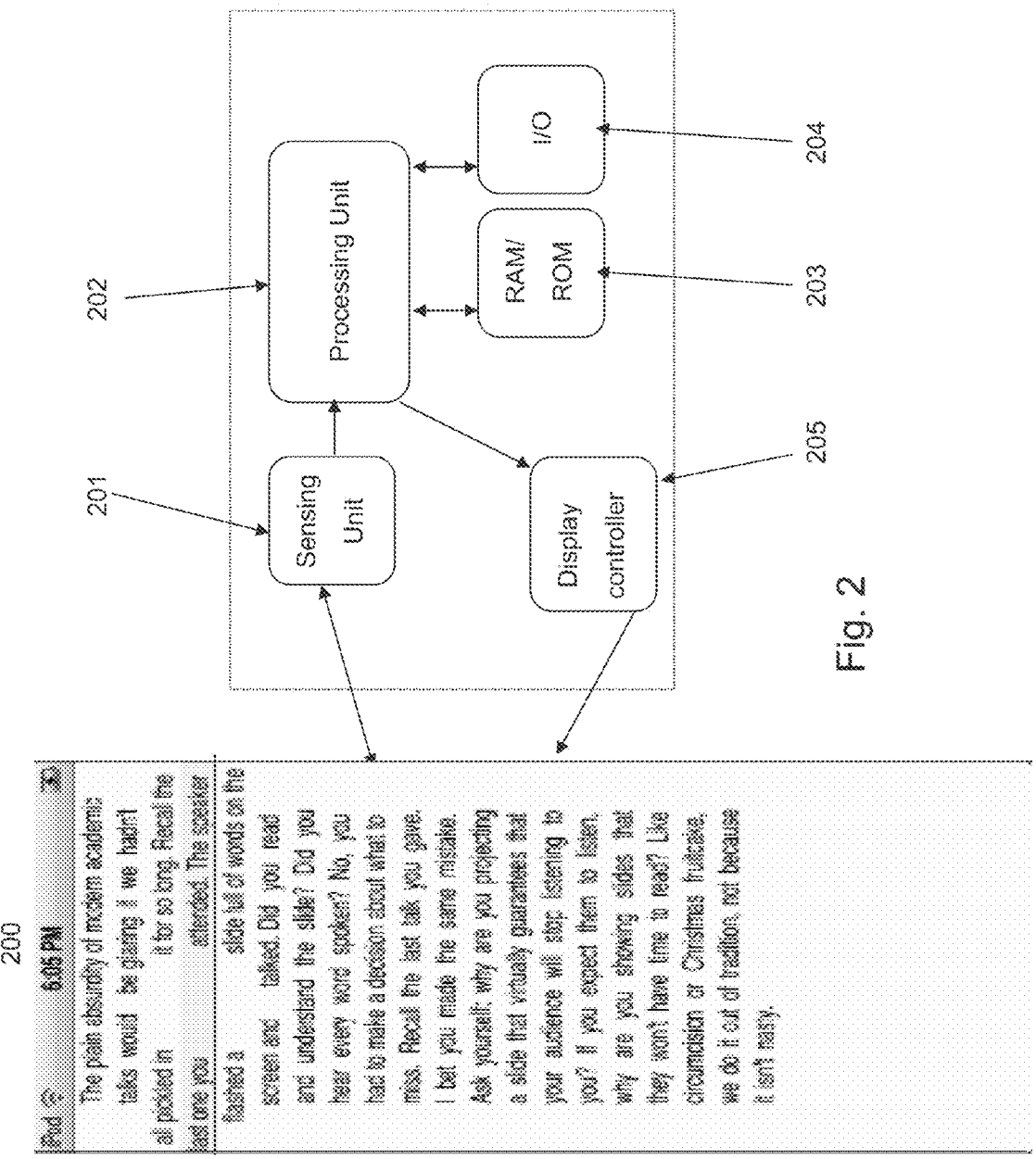
FIG. 2 illustrates an exemplary functional diagram of an embodiment of the inventive technique as applied to a potential hardware apparatus.

FIG. 2 illustrates an example functional diagram of an embodiment as applied to a potential hardware apparatus.

When the user touches the touch display, 200, a sensing unit 201, which is also referred to as touch-screen input interface, can be provided to receive the input from the interaction on the touch display. The sensing unit forwards instructions to the processing unit 202, which can include RAM 203 and other I/O 204. The processing unit proceeds to process the touch input, and forwards instructions to the display controller 205, which outputs to the display. In this case, a hole is created where the user had touched the display, and a highlighting line is created indicating the row of the display that the cursor is currently located.

Figure 3:
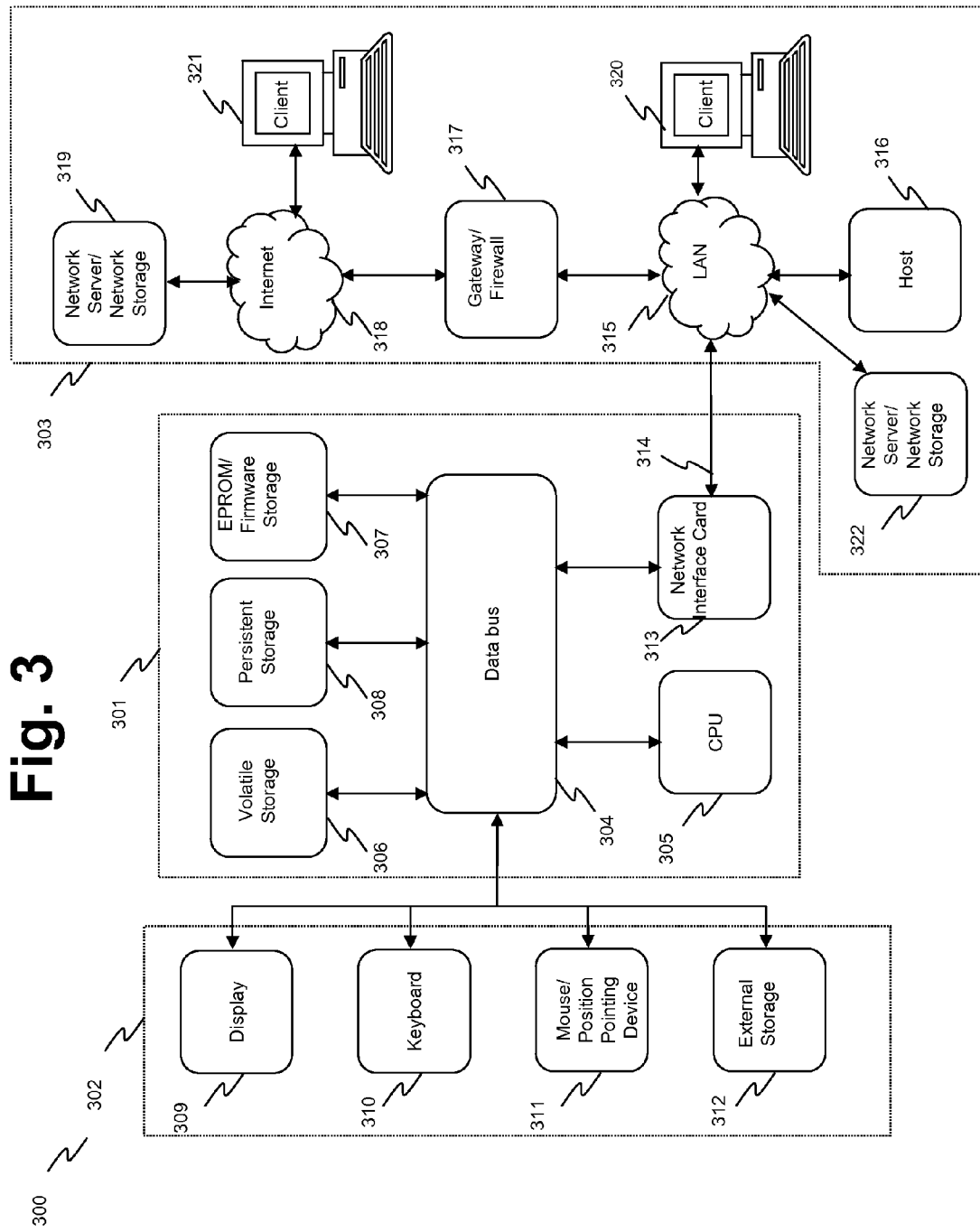
FIG. 3 illustrates an exemplary embodiment of a computer platform upon which the inventive system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 310, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be coupled to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive system may reside on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 308. Volatile media includes dynamic memory, such as volatile storage 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 305 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is coupled to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth, may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Local network 315 and the Internet 318 both use electrical, electromagnetic or optical signals that carry digital data streams. The signals through the various networks and the signals on network link 314 and through communication interface 313, which carry the digital data to and from computer platform 301, are exemplary forms of carrier waves transporting the information.

Computer platform 301 can send messages and receive data, including program code, through the variety of network (s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution. In this manner, computer system 301 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized systems for providing interaction of users with touch screen devices. It is intended that the specification and examples be considered as exemplary only, with a true scope and spirit of the invention being indicated by the following claims.

What is claimed is:

1. A method for avoiding occlusion on a touch screen device, the device comprising a touch-screen input interface, a processor and a display module, the method comprising:

using the touch-screen input interface to receive a touch input event from a user on a location on the display module, the location being characterized by location coordinates, the touch input event being caused by a touching of the display module;

using the processor to create an information-free zone at the location on the display module in response to the touch input event, wherein objects within the information-free zone are pushed out of the information-free zone;

using the touch-screen input interface to sense an end of the touching of the display module;

in response to the end of the touching of the display module, eliminating the information-free zone by displaying the objects within the information-free zone, and placing the cursor within the information-free zone, wherein in response to creating the information-free zone, providing feedback to the user as a highlighted area on a line crossing the information-free zone, that highlights a portion of the objects within the information-free zone which are pushed out of the information free-zone and is based on a major axis of the touch input event, and when the touching of the display module ends, the cursor is placed within the portion and between an object pushed to one side of the information-free zone and an object pushed to the other side of the information-free zone, and the feedback ends.

2. The method of claim 1, wherein the objects within the portion are words, letters, or symbolic units presented on the display.

3. The method of claim 1, wherein the objects are graphical images.

4. The method of claim 1, wherein the line crossing the information-free zone is offset from the major axis of the touch input event.

5. The method of claim 1, wherein the major axis of the touch input event is a major axis of the information-free zone.

6. A portable device comprising:
a touch-screen input interface;
a processor;
and a display module;
wherein the touch-screen input interface is operable to receive a touch input event from a user on a location on the display module, the location being characterized by location coordinates, the touch input event being caused by a touching of the display module;
wherein upon receiving a touch input event on the display module, the processor executes instructions for placing a cursor onto the display module, the instructions comprising:
creating an information-free zone at the location in response to the touch input event, wherein objects within the location are pushed out of the information-free zone; in response to the end of the touching of the display module, eliminating the information-free zone by displaying the objects within the information-free zone; and
placing the cursor within the information-free zone,
wherein in response to creating the information-free zone, providing feedback to the user as a highlighted area on a line crossing the information-free zone, that highlights a portion of the objects within the information-free zone which are pushed out of the information free-zone and is based on a major axis of the touch input event, and when the touching of the display module ends, the cursor is placed within the portion and between an object pushed to one side of the information-free zone and an object pushed to the other side of the information-free zone, and the feedback ends.

7. The device of claim 6, wherein the objects displayed near the information-free zone are text objects or symbolic units within a document.

8. The device of claim 6, wherein the objects are graphical images.

9. A computerized system, comprising:
a touch-screen input interface;
a processor; and
a display module;
wherein the touch-screen input interface is operable to receive a touch input event from a user on a location on the display module, the location being characterized by location coordinates, the touch input event being caused by a touching of the display module;
wherein upon receiving a touch input event on the display module, the processor executes instructions for placing a cursor onto the display module, the instructions comprising:
creating an information-free zone at the location in response to the touch input event,
wherein objects within the location are pushed out of the information-free zone; in response to the end of the touching of the display module, eliminating the information-free zone by displaying the objects within the information-free zone; and
placing the cursor within the information-free zone,
wherein in response to creating the information-free zone, providing feedback to the user as a highlighted area on a line crossing the information-free zone, that highlights a portion of the objects within the information-free zone which are pushed out of the information free-zone and is based on a major axis of the touch input event, and when the touching of the display module ends, the cursor is placed within the portion and between an object pushed to one side of the information-free zone and an object pushed to the other side of the information-free zone, and the feedback ends.

10. The computerized system of claim 9, wherein the objects are words, letters or symbolic units presented on the display module.

11. The device of claim 9, wherein the objects are graphical images.

* * * * *